(12) United States Patent
Huprikar et al.

(10) Patent No.: US 7,070,157 B2
(45) Date of Patent: Jul. 4, 2006

(54) MOUNT ASSEMBLY

(75) Inventors: Anand Huprikar, Novi, MI (US); Tom St. Henry, Ann Arbor, MI (US)

(73) Assignee: BASF Corporation, Florham Park, NJ (US)

( * ) Notice: Subject to any disclaimer, the term of this patent is extended or adjusted under 35 U.S.C. 154(b) by 197 days.

(21) Appl. No.: 10/872,047

(22) Filed: Jun. 17, 2004

(65) Prior Publication Data

US 2005/0279910 A1    Dec. 22, 2005

(51) Int. Cl.
*F16M 13/00* (2006.01)
(52) U.S. Cl. .................. 248/636; 248/560; 296/35.1
(58) Field of Classification Search ............. 248/636, 248/560, 566, 569, 573; 267/141, 153, 140.5, 267/292, 254; 296/35.1
See application file for complete search history.

(56) References Cited

U.S. PATENT DOCUMENTS

| | | | | |
|---|---|---|---|---|
| 3,304,043 A * | 2/1967 | Beck | ........................ | 267/140.5 |
| 3,809,427 A * | 5/1974 | Bennett | ...................... | 296/35.1 |
| 3,895,408 A * | 7/1975 | Leingang | ...................... | 16/2.1 |
| 4,286,777 A | 9/1981 | Brown | ...................... | 267/63 R |
| 4,478,396 A | 10/1984 | Kawaura | | |
| 4,895,115 A | 1/1990 | Weber et al. | ............ | 123/195 A |
| 5,170,997 A * | 12/1992 | Girard et al. | .................. | 267/35 |
| 5,743,509 A | 4/1998 | Kanda et al. | ................ | 248/635 |
| 5,799,930 A | 9/1998 | Willett | ..................... | 267/141.4 |
| 5,979,884 A * | 11/1999 | Sato et al. | ............. | 267/140.13 |
| 6,361,096 B1 | 3/2002 | Kim | .......................... | 296/35.1 |
| 6,364,296 B1 | 4/2002 | Cummings et al. | ...... | 267/141.4 |
| 6,419,215 B1 | 7/2002 | Johnson et al. | ............. | 267/292 |
| 2005/0073166 A1 | 4/2005 | Snyder | | |
| 2005/0280195 A1* | 12/2005 | Huprikar et al. | ......... | 267/141.1 |

FOREIGN PATENT DOCUMENTS

JP        53-137318    * 11/1978

* cited by examiner

*Primary Examiner*—Ramon O Ramirez
(74) *Attorney, Agent, or Firm*—Fernando A. Borrego (57) ABSTRACT

A mount assembly for use in an automotive suspension system, body mount, cradle mount, or other like device. The mount assembly includes a polyurethane elastomer carrier mounted to a frame and having a peripheral outer rim. A microcellular polyurethane insulator is coupled to the frame and extends beyond the peripheral outer rim. The polyurethane elastomer of the carrier has a first modulus of elasticity. The microcellular polyurethane of the insulator has a second modulus of elasticity that is less than the first modulus of elasticity of the carrier such that the mount assembly can provide two distinct rates of elasticity, or stiffness, for adequately isolating both low amplitude, high frequency vibrations and high amplitude, low frequency impacts.

26 Claims, 6 Drawing Sheets

MOUNT ASSEMBLY

BACKGROUND OF THE INVENTION

1. Field of the Invention

The subject invention relates to a mount assembly for a vehicle wherein the mount assembly isolates vibrational and/or translational movements between a frame of the vehicle and a vehicle body.

2. Description of Related Art

Mount assemblies for vehicles are well known in the art. Examples of such assemblies are shown in U.S. Pat. Nos. 5,799,930 and 6,361,096. Each of these assemblies include a steel carrier having one or more insulators. The carrier and insulators are mounted between a frame of a vehicle and a vehicle body in order to isolate movement between the frame and vehicle body. The insulators are typically formed of an elastomeric material such as rubber or microcellular polyurethane (MPU).

The stiffness of the insulator is based on material stiffness (modulus of elasticity) and geometry. As such, one important factor in the development of mount assemblies relates to the modulus of elasticity, also known as a spring rate, of the insulators. The insulators can have a relatively soft spring rate, which is preferred for isolating vibrational motion. Vibrational motion is generally associated with lower amplitudes and higher frequencies, such as when a vehicle travels over typical undulations of a road surface. It is desirable to have the insulators operate at lower or softer spring rate to allow for improved isolation and cushioning of the vibrations of the frame relative to the vehicle body.

On the other hand, the insulators can have relatively stiff or hard spring rates, which is preferred for controlling translational motion. Translational motion is typically associated with high amplitude, lower frequency events such as impacts, which can define a maximum displacement of the frame relative to the vehicle body.

In order to achieve the desired cushioning performance, prior art insulators are at times formed of a material having a low modulus of elasticity, such as microcellular polyurethane (MPU). Although, these MPU insulators can provide the soft spring rate as well as some maximum displacement control, the total maximum displacement is sometimes still too large and the nature and location of the transition from soft to hard spring rate cannot be controlled independent of the properties of polymer. Thus these types of insulators are not easily tunable. Also, soft insulators, such as MPU, can have a relatively large height, which require large clearances between the carrier and the frame. This also creates an undesirable large displacement between the carrier and the frame during translational motion which equates to an undesirable large movement (maximum displacement) between the frame and the vehicle body. Further, MPU is more difficult to mold and thus provides limited choices of geometry.

In order to overcome some of the above disadvantages, the prior art has contemplated forming insulators of materials having different modulus of elasticity. These insulators are a compromise between softer spring rates, to isolate vibrations, and higher spring rates, to isolate impacts. For example, U.S. Pat. Nos. 4,286,777 and 6,419,215, discloses an insulator formed of two materials having different modulus of elasticity. The advantage of this type of insulator design relates to the tuneability or customization of the insulator for a particular application. However, the conventional insulators still have significant limitations and typically cannot be adequately customized or tuned. As such, there remains an opportunity to further develop the material and geometrical features of the mount assemblies.

Accordingly, it would be desirable to develop a mount assembly that is of a reasonable height, takes advantage of a low or soft spring rate, has low maximum displacement, and is easily tunable or customizable.

SUMMARY OF THE INVENTION AND ADVANTAGES

A mount assembly for use with a vehicle having a frame. The assembly comprises a carrier having a peripheral outer rim. The carrier is adapted to be mounted to the frame of the vehicle. An insulator is adapted to be coupled to the frame of the vehicle and extends beyond the peripheral outer rim. The carrier is formed of a polyurethane elastomer having a first modulus of elasticity. The insulator is formed of a microcellular polyurethane having a second modulus of elasticity that is less than the first modulus of elasticity of the carrier such that the mount assembly can provide two distinct rates of elasticity for adequately isolating both low amplitude, high frequency vibrations and high amplitude, low frequency impacts.

Accordingly, the mount assembly of the subject invention, through material improvements, is formed of two different materials having different modulus of elasticity. The unique combination of a microcellular polyurethane insulator and a polyurethane elastomer carrier provides special benefits that are not available with other material combinations. This improved mount assembly is therefore of a reasonable height, takes advantage of a soft spring rate, and can adequately control significant impacts, which equates to low maximum displacement. The improved mount assembly is also easily tunable or customizable. As described in more detail below, the mount assembly of the subject invention also includes various geometrical improvements

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE INVENTION

Figure 1:
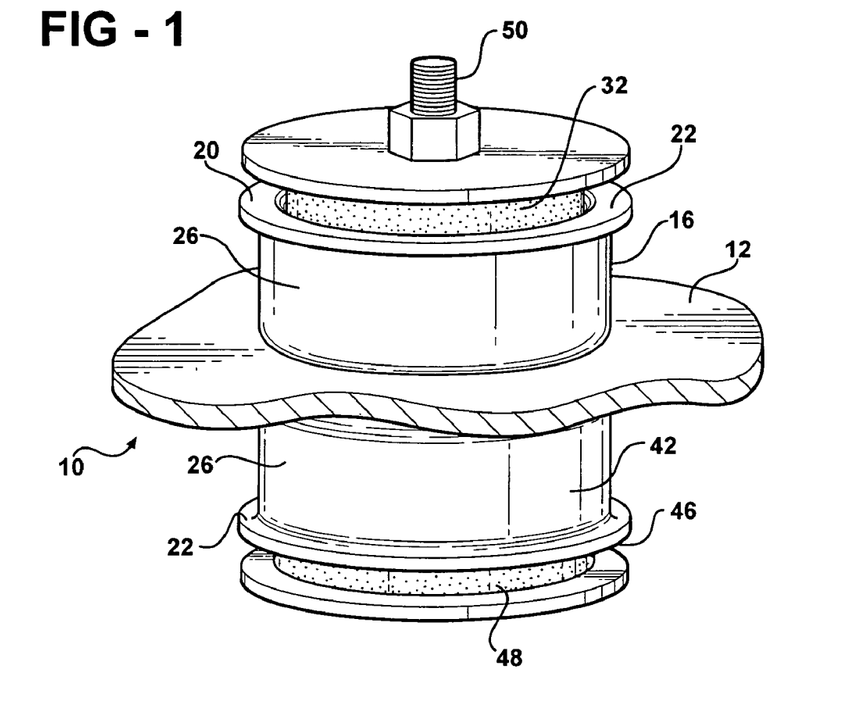
FIG. 1 is a perspective view of a mount assembly in accordance with a first embodiment of the subject invention.
Figure 2:
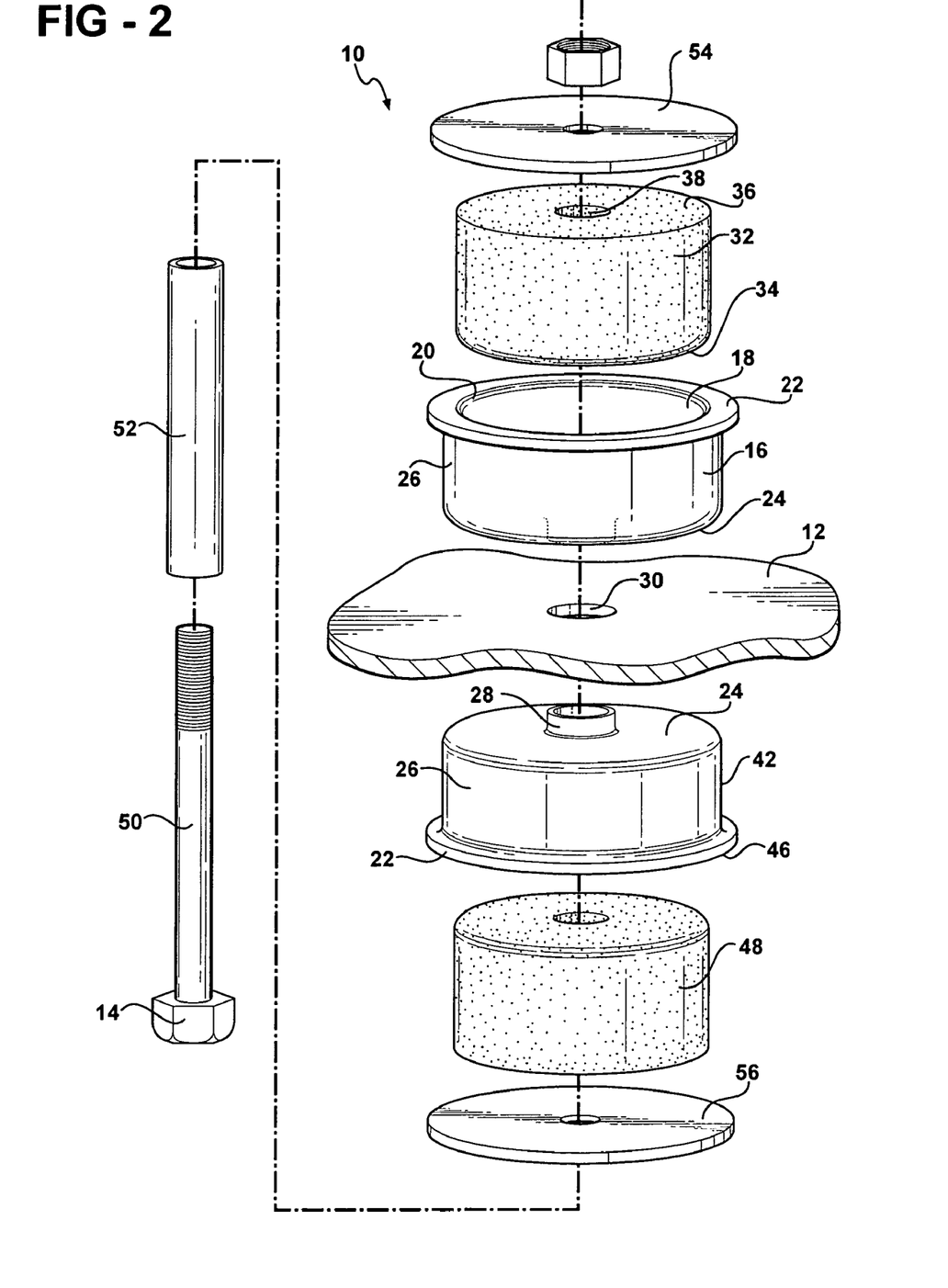
FIG. 2 is an exploded perspective view of the mount assembly of FIG. 1.
Figure 3:
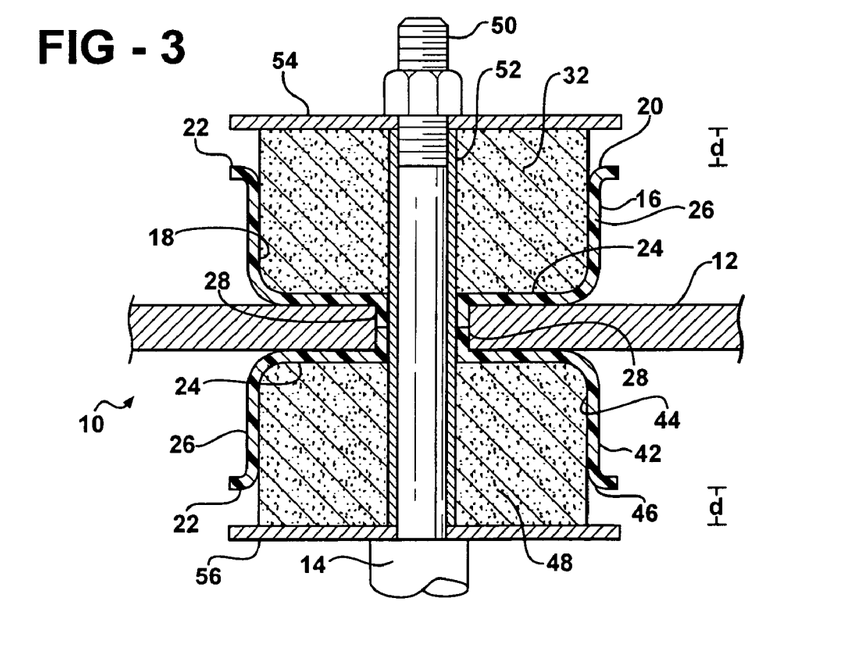
FIG. 3 is a cross-sectional view of the mount assembly of FIG. 1.

Referring to the Figures, wherein like numerals indicate like or corresponding parts throughout the several views, a mount assembly in accordance with a first embodiment of the subject invention is generally shown at 10 in FIGS. 1–3. The mount assembly 10 is preferably designed for use with a vehicle having a frame 12. In this first embodiment, the mount assembly 10 is more preferably designed as a top portion to an automotive suspension system, not entirely shown. The automotive suspension system includes a damper rod 14 for which the mount assembly 10 is attached. Automotive suspension systems are well known in the automotive industry and, as such, will not be discussed in any greater detail. It is contemplated that the mount assembly 10 of the subject invention is equally applicable to body mounts, bump stops, and other like applications. In fact, the mount assembly 10 is illustrated in other applications, as will be discussed below in relation to the second and third embodiments.

The mount assembly 10 includes a carrier 16 preferably having a substantially cup shaped configuration defining an inner cavity 18 and a peripheral outer rim 20. Even more preferably, the peripheral outer rim 20 of the carrier 16 is continuous and substantially circular to form a substantially circular cavity 18 within the carrier 16. Also, the peripheral outer rim 20 of the carrier 16 preferably includes a curved distal end 22 bending outwardly away from the cavity 18. The cup shaped carrier 16 includes a substantially flat bottom 24 and a substantially upstanding wall 26 extending between the peripheral outer rim 20 and the flat bottom 24 to further define the cavity 18 within the carrier 16. The flat bottom 24 of the carrier 16 defines an opening and the carrier 16 further includes a second wall 28 surrounding the opening and extending in a direction opposite to the upstanding wall 26.

The carrier 16 is adapted to be mounted to the frame 12 of the vehicle. Specifically, a portion of the flat bottom 24 and the second wall 28 abut the frame 12 of the vehicle. The frame 12 includes an aperture 30 and the second wall 28 extends at least partially within the aperture 30 to isolate any metal to metal contact, as will be discussed below.

The carrier 16 is formed of a polyurethane elastomer having a first modulus of elasticity. Preferably, the curved distal end 22, the upstanding wall 26, the flat bottom 24, and the second wall 28 are formed of a homogenous polyurethane elastomer having a substantially uniform thickness. As discussed in the background section above, carriers are typically formed of steel. The mount assembly 10 of the subject invention provides a unique material for the carrier 16, namely the polyurethane elastomer. A polyurethane elastomer is characterized by the fact that, at ambient temperature, following mechanical stress, the polyurethane elastomer recovers from deformation within certain limits. More specifically, a polyurethane elastomer (under a tensile test) has the ability to be stretched to at least twice its original length and to retract rapidly to its original length when released. In other words, after stress removal, the carrier 16 would resume its original shape. A polyurethane elastomer can be injection molded, extruded, or blow molded, which allows for intricate designs and geometry not traditionally found in the prior art carriers. An example of an intricate design of the carrier 16 is shown in the alternative embodiments. A polyurethane elastomer also exhibits good resistance to abrasion and weathering. The polyurethane elastomer is further defined as having the first modulus of elasticity ranging from 10 mega pascals (MPa) to 1,000 mega pascals (MPa). The modulus of elasticity is a measure of the stiffness of the material.

Preferably, the polyurethane elastomer is selected from the group comprising thermoplastic polyurethane and thermoset polyurethane. The first modulus of elasticity is therefore defined by the thermoplastic polyurethane and has a range from 10 MPa to 500 MPa. Alternatively, the first modulus of elasticity is defined by the thermoset polyurethane and has a range from 50 MPa to 1,000 MPa. Even more preferably, the thermoset polyurethane is further defined as cast polyurethane. As known to those skilled in the art, the primary difference between thermoplastic and thermoset polyurethanes is the ability to repeatedly remelt and reform the material. In particular, thermoplastic polyurethane is capable of being remelted and reformed where thermoset polyurethane sets irreversibly when heated.

The mount assembly 10 also includes an insulator 32 disposed within the cavity 18 of the carrier 16 extending beyond the peripheral outer rim 20. The insulator 32 includes first 34 and second 36 ends and a substantially circular outer surface disposed between the ends 34, 36 with the first end 34 and a portion of the outer surface being disposed within the circular cavity 18. The second end 36 extends beyond the peripheral outer rim 20 to define a distance (d) between the second end 36 and the outer rim 20. The insulator 32 defines an opening 38 extending therethrough with the opening 38 of the insulator 32 aligned with the opening of the carrier 16 when the insulator 32 is disposed within the cavity 18 of the carrier 16.

The insulator 32 is formed of a microcellular polyurethane having a second modulus of elasticity that is less than the first modulus of elasticity of the carrier 16. The microcellular polyurethane is further defined as having the second modulus of elasticity at low displacement of being less than 100 MPa and densities between 0.3 gm/cm$^3$ to 0.8 gm/cm$^3$. The modulus of elasticity for microcellular polyurethane is non-linear such that the load deflection curve is parabolic in nature.

Figure 9:
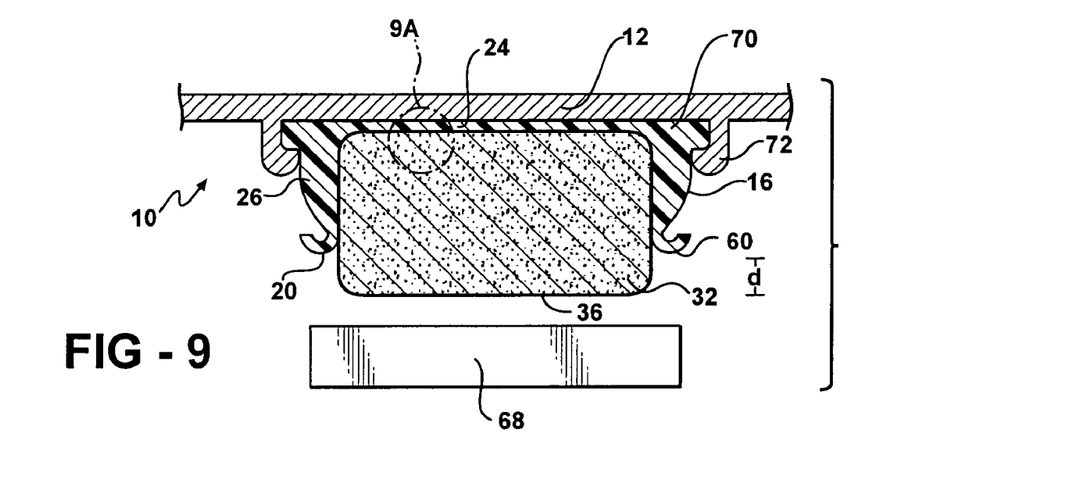
FIG. 9 is a cross-sectional view of the mount assembly of FIG. 7.
Figure 9A:
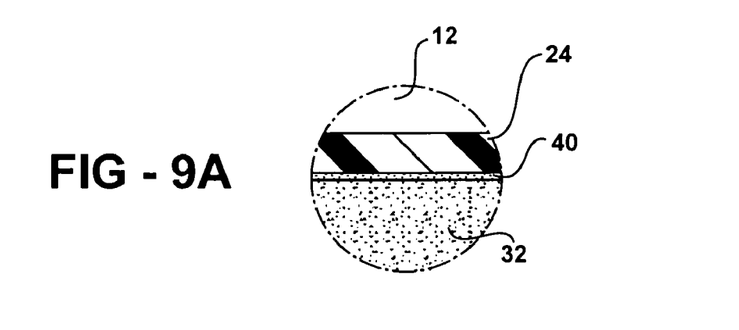
FIG. 9A is an enlarged sectional view taken from FIG. 9.

Due to the unique material combination of the subject invention, the mount assembly 10 can provide two distinct rates of elasticity for adequately isolating both low amplitude, high frequency vibrations and high amplitude, low frequency impacts. Specifically, the mount assembly 10 of the subject invention combines the high modulus thermoplastic or thermoset polyurethane with the relatively softer, low modulus microcellular polyurethane wherein vibrations are isolated through the microcellular polyurethane and impacts are isolated through the thermoplastic or thermoset polyurethane. As discussed above, the polyurethane elastomer carrier 16 can provide many possible exterior shapes or geometry, which provide a high balance and transition of soft to hard stiffness when the polyurethane elastomer carrier 16 is employed in series with the microcellular polyurethane insulator 32. Another advantage of using the elastomeric polyurethane, such as thermoplastic or thermoset polyurethane, and microcellular polyurethane is that these materials are readily bondable using urethane glues, as is well known in the art. As such, the microcellular polyurethane insulator 32 could be bonded within the polyurethane elastomeric carrier 16. A layer of urethane glue 40 for bonding the insulator 32 to the carrier 16 is illustrated in FIG. 9A. This ability to bond allows for an integrated composite mount assembly 10.

In the first embodiment of the subject invention illustrated in FIGS. 1–3, a virtually identical carrier and insulator are disposed in opposing relationship to the carrier 16 and insulator 32 discussed above. As such, the carrier 16 is further defined as a first carrier 16 and the first embodiment includes a second carrier 42 preferably having a substantially cup shaped configuration defining a second inner cavity 44 and a second peripheral outer rim 46. The second carrier 42 is similarly adapted to be mounted to the frame 12 of the vehicle opposite the first carrier 16. The second carrier 42 preferably has a substantially identical configuration to the first carrier 16, including the curved distal end 22, the upstanding wall 26, the flat bottom 24, and the second wall 28. It should be appreciated that the second carrier 42 could be of an alternative configuration to the first carrier 16 without deviating from the scope of the subject invention.

Similarly, the insulator 32 is further defined as a first insulator 32 and the first embodiment also includes a second insulator 48. The second insulator 48 is disposed within the second inner cavity 44 of the second carrier 42 and extends beyond the second peripheral outer rim 46 of the second carrier 42 in a similar fashion as the first insulator 32 within the first carrier 16.

The second carrier 42 is formed of a polyurethane elastomer having a third modulus of elasticity with the material properties in the same range as the first carrier 16. Preferably, the second carrier 42 is also formed of a homogenous polyurethane elastomer having a substantially uniform thickness. The second insulator 48 is formed of a microcellular polyurethane having a fourth modulus of elasticity that is less than the third modulus of elasticity of the second carrier 42. The first and third modulus of elasticity are substantially identical. Further, the second and fourth modulus of elasticity are substantially identical. The mount assembly 10 of the first embodiment can therefore provide multiple rates of elasticity for adequately isolating both low amplitude, high frequency vibrations and high amplitude, low frequency impacts in a multitude of directions.

As mentioned above, the mount assembly 10 of this first embodiment is mounted to the damper rod 14 of the automotive suspension system. Specifically, the damper rod 14 includes a stepped shaft 50 that extends through the openings in the first 16 and second 42 carriers and the openings 38 in the first 32 and second 48 insulators. A tube 52 surrounds the damper rod 14 and separates the damper rod 14 from the carriers 16, 42 and insulators 32, 48. An upper washer 54 abuts one end of the tube 52 and the first insulator 32. Similarly, a lower washer 56 abuts an opposing end of the tube 52 and the second insulator 48. The stepped shaft 50 of the damper rod 14 is bolted between the upper 54 and lower 56 washers. As such, the damper rod 14, upper washer 54, lower washer 56, and tube 52 move as a single component relative to the frame 12 of the vehicle.

As shown in FIG. 3, the damper rod 14, washers 54, 56, and tube 52 can move through a distance (d) to isolate the damper rod 14 from the frame 12 during the low amplitude, high frequency vibrations. The isolation of the vibrations, through distance (d), is accomplished through the use of one or more of the first 32 and second 48 microcellular polyurethane insulators. Depending upon the direction of the vibration being applied to the mount assembly 10, one of the insulators 32, 48 will compress and the opposing insulator 32, 48 will expand to an equal degree. Microcellular polyurethane insulators are well suited for isolation of these types of vibrations. As known to those skilled in the art, the mount assembly 10 shown in FIGS. 1 and 3 is illustrated in a partially compressed condition. As such, the insulators 32, 48 can expand and will preferably remain in continuous contact with the associated carrier 16, 42 and washer 54, 56.

During isolation of the high amplitude, low frequency impacts, one of the upper 54 or lower 56 washers compresses the associated insulator 32, 48 beyond the distance (d) and abuts the associated curved distal end 22 of the associated carrier 16, 42. The carrier 16, 42 has a greater modulus of elasticity such that the carrier 16, 42 can in turn isolate the larger forces associated with the impacts. The polyurethane elastomer carrier 16, 42 has some flexibility and allows some compression but limits outward expansion. Hence, the overall stiffness of the mount assembly 10 is increased and excess travel of the damper rod 14 is prevented.

As mentioned above, the first carrier 16 includes a second wall 28 extending at least partially into the aperture 30 in the frame 12. Similarly, the second carrier 42 includes a second wall 28 extending at least partially into the aperture 30 in the frame 12 in such a manner to mate with the second wall 28 of the first carrier 16. Preferably, the second walls 28 of the first 16 and second 42 carriers substantially fill the aperture 30 in the frame 12 to isolate any metal to metal contact between the tube 52, or any other component, and the frame 12. Even more preferably, the second wall 28 of the first carrier 16 extends half way into the aperture 30 and the second wall 28 of the second carrier 42 extends the remaining half way into the aperture 30. The second walls 28 provide significant stiffness in the radial direction, which limits or eliminates lateral displacements of the damper rod 14 relative to the frame 12. The second walls 28 also prevent any noise or rattling between the damper rod 14 and frame 12.

Figure 4:
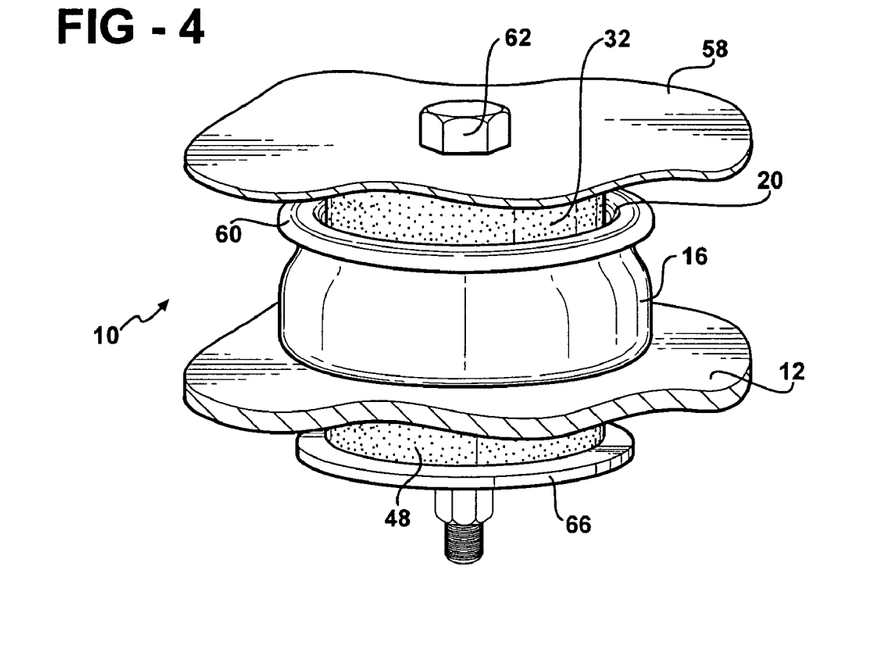
FIG. 4 is a perspective view of a mount assembly in accordance with a second embodiment of the subject invention.
Figure 5:
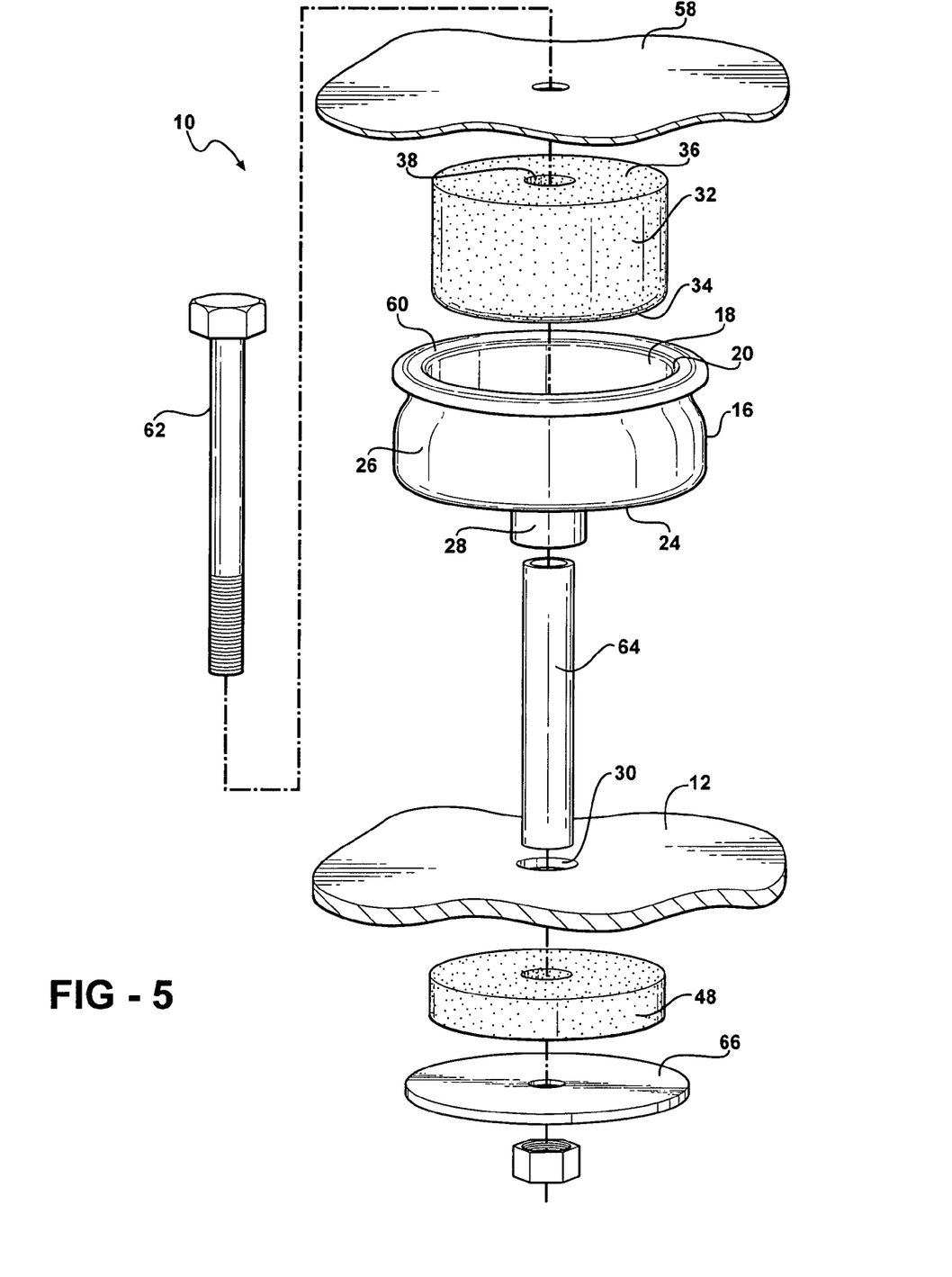
FIG. 5 is an exploded perspective view of the mount assembly of FIG. 4.
Figure 6:
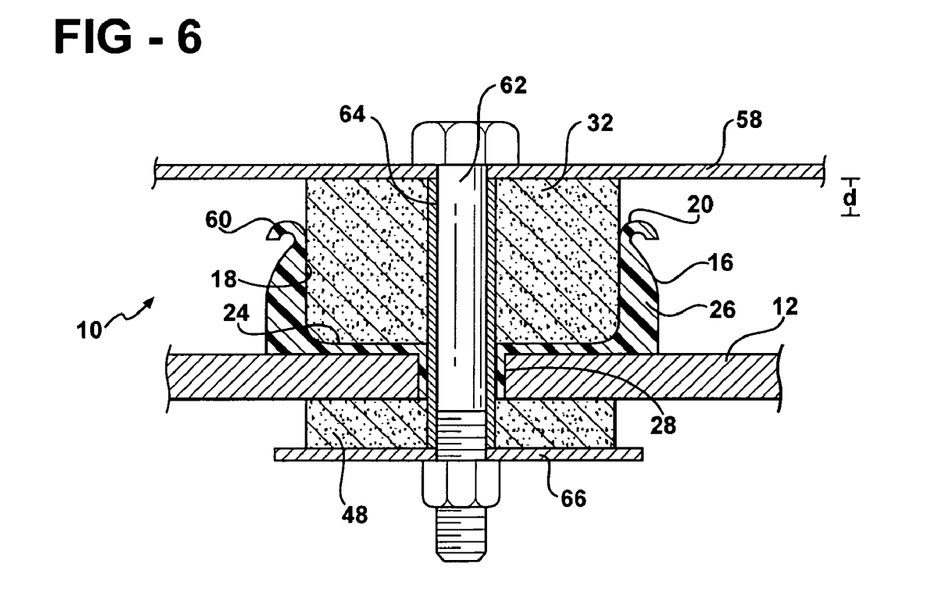
FIG. 6 is a cross-sectional view of the mount assembly of FIG. 4.

Turning to FIGS. 4–6, a second embodiment of the mount assembly 10 in accordance with the subject invention is disclosed. This embodiment shares many of the unique features of the mount assembly 10 of the first embodiment. However, the second embodiment relates to a body mount, which is typically disposed between a frame 12 of the vehicle and a vehicle body 58.

The mount assembly 10 of this second embodiment also includes a carrier 16 preferably having a substantially cup shaped configuration defining an inner cavity 18 and a peripheral outer rim 20. Even more preferably, the peripheral outer rim 20 of the carrier 16 is continuous and substantially circular to form a substantially circular cavity 18 within the carrier 16. In this embodiment, however, the peripheral outer rim 20 of the carrier 16 preferably includes a curled distal end 60 curling outwardly away from the cavity 18. The cup shaped carrier 16 includes a substantially flat bottom 24 and a substantially upstanding wall 26 extending between the peripheral outer rim 20 and the flat bottom 24 to further define the cavity 18 within the carrier 16. The flat bottom 24 of the carrier 16 defines an opening and the carrier 16 further includes a second wall 28 surrounding the opening and extending in a direction opposite to the upstanding wall 26.

The carrier 16 is adapted to be mounted to the frame 12 of the vehicle. Specifically, a portion of the flat bottom 24 and the second wall 28 abut the frame 12 of the vehicle. The frame 12 includes an aperture 30 and the second wall 28 extends at least partially within the aperture 30 to isolate any metal to metal contact, as will be discussed below.

The carrier 16 is formed of a polyurethane elastomer having a first modulus of elasticity. The polyurethane elastomer is further defined as having the first modulus of elasticity ranging from 10 MPa to 1,000 MPa. Preferably, the polyurethane elastomer is selected from the group comprising thermoplastic polyurethane and thermoset polyurethane. Even more preferably, the thermoset polyurethane is further defined as cast polyurethane.

Preferably, in this embodiment, the curled distal end 60, the upstanding wall 26, the flat bottom 24, and the second wall 28 are formed of a homogenous polyurethane elastomer having a non-uniform thickness. As illustrated, a lower portion of the upstanding wall 26 has a greater thickness than an upper portion and the curled distal end 60. This more intricate design is achievable due to the material of the carrier, i.e., the polyurethane elastomer, and the fact that this material can be injection molded. It should be appreciated that the carrier 16 may be of any suitable design or configuration.

The mount assembly 10 of this second embodiment also includes an insulator 32 disposed within the cavity 18 of the carrier 16 extending beyond the peripheral outer rim 20. The insulator 32 includes first 34 and second 36 ends and a substantially circular outer surface disposed between the ends with the first end 34 and a portion of the outer surface being disposed within the circular cavity 18. The second end 36 extends beyond the peripheral outer rim 20 to define a distance (d) between the second end 36 and the outer rim 20. The insulator 32 defines an opening 38 extending therethrough with the opening 38 of the insulator 32 aligned with the opening 38 of the carrier 16 when the insulator 32 is disposed within the cavity 18 of the carrier 16.

The insulator 32 is formed of a microcellular polyurethane having a second modulus of elasticity that is less than the first modulus of elasticity of the carrier 16. The microcellular polyurethane is further defined as having the second modulus of elasticity being less than 100 MPa. Hence, the mount assembly 10 can provide two distinct rates of elasticity for adequately isolating both low amplitude, high frequency vibrations and high amplitude, low frequency impacts. Specifically, the mount assembly 10 of the subject invention combines the high modulus thermoplastic or thermoset polyurethane with the relatively softer, low modulus microcellular polyurethane wherein vibrations are isolated through the microcellular polyurethane and impacts are isolated through the thermoplastic or thermoset polyurethane. Another advantage of using the elastomeric polyurethane, such as thermoplastic or thermoset polyurethane, and microcellular polyurethane is that these materials are readily bondable using urethane glues, as is well known in the art. As such, the microcellular polyurethane insulator 32 could be bonded within the polyurethane elastomer carrier 16. A layer of urethane glue 40 bonding the insulator 32 to the carrier 16 is illustrated in FIG. 9A. This ability to bond allows for an integrated composite mount assembly 10.

In the second embodiment of the subject invention illustrated in FIGS. 4–6, a second insulator 48 may be provided in opposing relationship to the carrier 16 and insulator 32 discussed above. The second insulator 48 is illustrated as a donut shaped microcellular polyurethane insulator 32.

As mentioned above, the mount assembly 10 of this second embodiment is designed as a body mount and is disposed between the frame 12 of the vehicle and the vehicle body 58. Specifically, a bolt 62 extends through the openings in the carrier 42 and the openings 38 in the insulators 32, 48. A tube 64 surrounds the bolt 62 and separates the bolt 62 from the carrier 16 and insulators 32, 48. The vehicle body 58 abuts one end of the tube 64 and the insulator 32. A washer 66 abuts an opposing end of the tube 64 and the second insulator 48. The bolt 62 is therefore mounted between the vehicle body 58 and washer 66. As such, the bolt 62, washer 66, tube 64, and vehicle body 58 operate as a single component.

As shown in FIG. 6, the frame 12 of the vehicle can move the carrier 16 through a distance (d) relative to the vehicle body 58, which isolates the vehicle body 58 from the frame 12 during the low amplitude, high frequency vibrations of the frame 12. The isolation of the vibrations, through distance (d), is accomplished through the use of one or more of the microcellular polyurethane insulators 32, 48. Depending upon the direction of the vibration being applied to the mount assembly 10, one of the insulators 32, 48 will compress and the opposing insulator 32, 48 will expand to an equal degree. Microcellular polyurethane insulators are well suited for isolation of these types of vibrations. As known to those skilled in the art, the mount assembly 10 as shown in FIGS. 4–6 is illustrated in a partially compressed condition. As such, the insulators 32, 48 can expand and will preferably remain in continuous contact with their associated components.

During isolation of the high amplitude, low frequency impacts, the frame 12 of the vehicle will move the carrier 16 beyond the distance (d) and completely compress the insulator 32. As such, the curled distal end 60 of the carrier 16 will abut the vehicle body 58. The carrier 16 has a greater modulus of elasticity such that the carrier 16 can in turn isolate the larger forces associated with the impacts. Hence, the overall stiffness of the mount assembly 10 is increased and excess travel of the frame 12 relative to the vehicle body 58 is prevented.

As mentioned above, the carrier 16 includes a second wall 28 extending at least partially into the aperture 30 in the frame 12. Preferably, the second wall 28 of the carrier 42 substantially fills the aperture 30 in the frame 12 to isolate any metal to metal contact between the tube 64, or any other component, and the frame 12. The second wall 28 provides significant stiffness in the radial direction, which limits or eliminates lateral displacements or shifting of the frame 12 relative to the vehicle body 58. The second wall 28 also prevents any noise or rattling between the damper rod 14 and frame 12.

Turning now to FIGS. 7–9A, a third embodiment of the mount assembly 10 in accordance with the subject invention is disclosed. This embodiment shares many of the unique features of the mount assembly 10 of the first and second embodiments. However, the third embodiment relates to a bump stop, which is typically disposed on a frame 12 of the vehicle and is spaced from a strike plate 68. Strike plates are typically found on an interior surface of a bumper.

Figure 7:
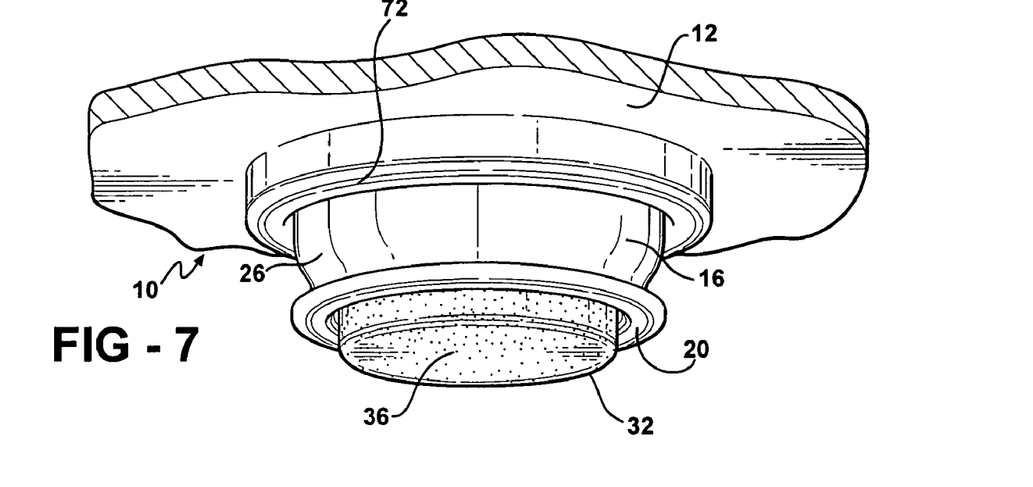
FIG. 7 is a perspective view of a mount assembly in accordance with a third embodiment of the subject invention.
Figure 8:
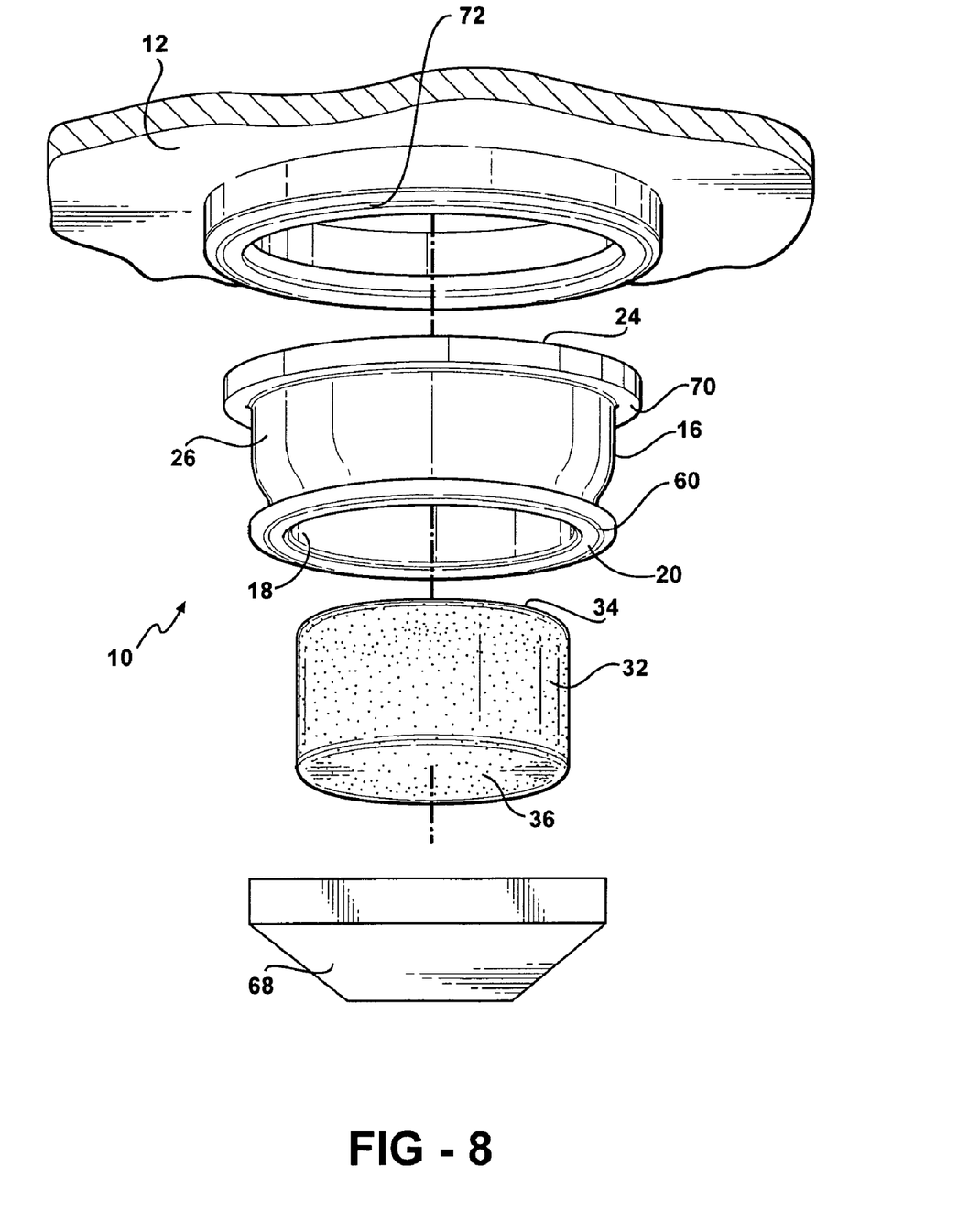
FIG. 8 is an exploded perspective view of the mount assembly of FIG. 7.

The mount assembly 10 of this third embodiment also includes a carrier 16 preferably having a substantially cup shaped configuration defining an inner cavity 18 and a peripheral outer rim 20. Even more preferably, the peripheral outer rim 20 of the carrier 16 is continuous and substantially circular to form a substantially circular cavity 18 within the carrier 16. In this embodiment, which is similar to the carrier 16 of the second embodiment, the peripheral outer rim 20 of the carrier 16 preferably includes a curled distal end 60 curling outwardly away from the cavity 18 and the insulator 32. The cup shaped carrier 16 includes a substantially flat bottom 24 and a substantially upstanding wall 26 extending between the peripheral outer rim 20 and the flat bottom 24 to further define the cavity 18 within the carrier 16.

The carrier 16 is adapted to be mounted to the frame 12 of the vehicle. Specifically, the flat bottom 24 abuts the frame 12 and a flange 70 extends outwardly from the flat bottom 24 for providing an attachment point for the frame 12 of the vehicle. The frame 12 includes a locking hook 72 that extends outwardly from the frame 12 and couples to the flange 70. It should be appreciated that the locking hook 72 may be a continuous ring, such as shown, or a series of discrete hooks.

The carrier 16 is formed of a polyurethane elastomer having a first modulus of elasticity. The polyurethane elastomer is further defined as having the first modulus of elasticity ranging from 10 MPa to 1,000 MPa. Preferably, the polyurethane elastomer is selected from the group comprising thermoplastic polyurethane and thermoset polyurethane. Even more preferably, the thermoset polyurethane is further defined as cast polyurethane.

Preferably, in this embodiment, the curled distal end 60, the upstanding wall 26, the flat bottom 24, and the second wall 28 are formed of a homogenous polyurethane elastomer having a non-uniform thickness. As illustrated, a lower portion of the upstanding wall 26 has a greater thickness than an upper portion and the curled distal end 60. This more intricate design is achievable due to the material of the carrier, i.e., the polyurethane elastomer, and the fact that this material can be injection molded. It should be appreciated that the carrier 16 may be of any suitable design or configuration.

The mount assembly 10 of this second embodiment also includes an insulator 32 disposed within the cavity 18 of the carrier 16 extending beyond the peripheral outer rim 20. The insulator 32 includes first 34 and second 36 ends and a substantially circular outer surface disposed between the ends 34, 36 with the first end 34 and a portion of the outer surface being disposed within the circular cavity 18. The second end 36 extends beyond the peripheral outer rim 20 to define a distance (d) between the second end 36 and the outer rim 20.

The insulator 32 is formed of a microcellular polyurethane having a second modulus of elasticity that is less than the first modulus of elasticity of the carrier 16. The microcellular polyurethane is further defined as having the second modulus of elasticity being less than 100 MPa. Hence, the mount assembly 10 can provide two distinct rates of elasticity for adequately isolating both low amplitude, high frequency vibrations and high amplitude, low frequency impacts. Specifically, the mount assembly 10 of the subject invention combines the high modulus thermoplastic or thermoset polyurethane with the relatively softer, low modulus microcellular polyurethane wherein vibrations are isolated through the microcellular polyurethane and impacts are isolated through the thermoplastic or thermoset polyurethane.

Another advantage of using the elastomeric polyurethane, such as thermoplastic or thermoset polyurethane, and microcellular polyurethane is that these materials are readily bondable using urethane glues, as is well known in the art. As such, the microcellular polyurethane insulator 32 could be bonded within the inner cavity 18 of the elastomeric polyurethane carrier 16. FIG. 9A illustrates an enlarged sectional view of the insulator 32 and carrier 16 of this third embodiment, which shows a layer of urethane glue 40 bonding the insulator 32 to the carrier 16. This ability to bond allows for an integrated composite mount assembly 10 without any additional fastening means.

As shown in FIG. 9, the strike plate 68 can move to abut the insulator 32 and then compress the insulator 32 through a distance (d) relative to the vehicle body 58, which isolates the vehicle body 58 from the strike plate 68. As the strike plate 68 continues to compress the insulator 32 beyond the distance (d), the strike plate 68 will contact the carrier 16. In particular, the strike plate 68 will contact the curled distal end 60 of the carrier 16. The carrier 16 has a greater modulus of elasticity such that the carrier 16 can in turn isolate the larger forces associated with the movement of the strike plate 68. Hence, the configuration of the mount assembly 10 achieves a soft transition from free travel of the strike plate 68 to gradually impeded travel over a short fixed distance. The forces associated with the movement of the strike plate 68 are typically associated with significant movement of an automotive bumper, which usually occurs during an automobile accident. Hence, these types of forces can be equated to a high amplitude, low frequency impact. After the forces of the impact have subsided, the strike plate 68 will retract from the mount assembly 10 and the insulator 32 and carrier 16 will return to their pre-compressed states.

The invention has been described in an illustrative manner, and it is to be understood that the terminology which has been used is intended to be in the nature of words of description rather than of limitation. As is now apparent to those skilled in the art, many modifications and variations of the present invention are possible in light of the above teachings. It is, therefore, to be understood that within the scope of the appended claims, wherein reference numerals are merely for convenience and are not to be in any way limiting, the invention may be practiced otherwise than as specifically described.

What is claimed is:

1. A mount assembly for use with a vehicle having a frame, said assembly comprising:
    a carrier having a peripheral outer rim with said carrier being adapted to be mounted to the frame of the vehicle; and
    an insulator adapted to be coupled to the frame of the vehicle and extending beyond said peripheral outer rim;
    said carrier formed of a polyurethane elastomer having a first modulus of elasticity and said insulator formed of a microcellular polyurethane having a second modulus of elasticity that is less than said first modulus of elasticity of said carrier such that said mount assembly can provide two distinct rates of elasticity for adequately isolating both low amplitude, high frequency vibrations and high amplitude, low frequency impacts.

2. An assembly as set forth in claim 1 wherein said polyurethane elastomer is further defined as having said first modulus of elasticity ranging from 10 MPa to 1,000 MPa.

3. An assembly as set forth in claim 1 wherein said polyurethane elastomer is selected from the group comprising thermoplastic polyurethane and thermoset polyurethane.

4. An assembly as set forth in claim 3 wherein said first modulus of elasticity is defined by said thermoplastic polyurethane and has a range from 10 MPa to 500 MPa.

5. An assembly as set forth in claim 3 wherein said first modulus of elasticity is defined by said thermoset polyurethane and has a range from 50 MPa to 1,000 MPa.

6. An assembly as set forth in claim 3 wherein said thermoset polyurethane is further defined as cast polyurethane.

7. An assembly as set forth in claim 1 wherein said microcellular polyurethane is further defined as having said second modulus of elasticity being less than 100 MPa.

8. An assembly as set forth in claim 1 wherein said carrier has a substantially cup shaped configuration defining an inner cavity.

9. An assembly as set forth in claim 8 wherein said peripheral outer rim of said carrier is continuous and substantially circular to form a substantially circular cavity within said carrier.

10. An assembly as set forth in claim 9 wherein said insulator includes first and second ends and a substantially circular outer surface disposed between said ends with said first end and a portion of said outer surface being disposed within said circular cavity.

11. An assembly as set forth in claim 8 wherein said insulator includes first and second ends with said first end disposed within said cavity of said carrier and said second end extending beyond said peripheral outer rim to define a distance (d) between said second end and said outer rim.

12. An assembly as set forth in claim 8 wherein said cup shaped carrier further includes a substantially flat bottom and a substantially upstanding wall extending between said peripheral outer rim and said flat bottom to further define said cavity within said carrier.

13. An assembly as set forth in claim 12 wherein said flat bottom of said carrier defines an opening and said carrier further includes a second wall surrounding said opening and extending in a direction opposite to said upstanding wall.

14. An assembly as set forth in claim 13 wherein said insulator defines an opening extending therethrough with said opening of said insulator aligned with said opening of said carrier when said insulator is disposed within said cavity of said carrier.

15. An assembly as set forth in claim 13 wherein said peripheral outer rim of said carrier includes a curved distal end bending outwardly away from said cavity and said insulator.

16. An assembly as set forth in claim 15 wherein said curved distal end, said upstanding wall, said flat bottom, and said second wall are formed of a homogenous polyurethane elastomer having a substantially uniform thickness.

17. An assembly as set forth in claim 13 wherein said peripheral outer rim of said carrier includes a curled distal end curling outwardly away from said cavity and said insulator.

18. An assembly as set forth in claim 17 wherein said curled distal end, said upstanding wall, said flat bottom, and said second wall are formed of a homogenous polyurethane elastomer having a non-uniform thickness.

19. An assembly as set forth in claim 12 wherein said carrier further includes a flange extending outwardly from said flat bottom for providing an attachment point for the frame of the vehicle.

20. An assembly as set forth in claim 19 wherein said peripheral outer rim of said carrier includes a curled distal end curling outwardly away from said cavity and said insulator.

21. An assembly as set forth in claim 20 wherein said curled distal end, said upstanding wall, said flat bottom, and said flange are formed of a homogenous polyurethane elastomer having a non-uniform thickness.

22. An assembly as set forth in claim 21 wherein said insulator is bonded to said inner cavity of said carrier.

23. An assembly as set forth in claim 1 wherein said carrier is further defined as a first carrier and further including a second carrier formed of a polyurethane elastomer having a second peripheral outer rim with said second carrier being adapted to be mounted to the frame of the vehicle opposite said first carrier.

24. An assembly as set forth in claim 23 wherein said insulator is further defined as a first insulator and further including a second insulator formed of a microcellular polyurethane with said second insulator adapted to be coupled to the frame of the vehicle and extending beyond said second peripheral outer rim of said second carrier.

25. An assembly as set forth in claim 24 wherein said second carrier includes a third modulus of elasticity and said second insulator includes a fourth modulus of elasticity that is less than said third modulus of elasticity of said second carrier such that said mount assembly can provide multiple rates of elasticity for adequately isolating both low amplitude, high frequency vibrations and high amplitude, low frequency impacts in a multitude of directions.

26. An assembly as set forth in claim 25 wherein said first and third modulus of elasticity are substantially identical and wherein said second and fourth modulus of elasticity are substantially identical.

* * * * *